(12) United States Patent
Libert et al.

(10) Patent No.: US 6,574,655 B1
(45) Date of Patent: Jun. 3, 2003

(54) ASSOCIATIVE MANAGEMENT OF MULTIMEDIA ASSETS AND ASSOCIATED RESOURCES USING MULTI-DOMAIN AGENT-BASED COMMUNICATION BETWEEN HETEROGENEOUS PEERS

(75) Inventors: Scott A. Libert, Tigard, OR (US); Robert J. Woolridge, Portland, OR (US); Baochun Jin, Beaverton, OR (US); Alex C. Tran, Tigard, OR (US); P. Murugavel, Bangalore (IN); Mark S. Hillebrandt, Portland, OR (US); Suhas Joshi, Bangalore (IN); Sridhar Krishnamurthy, Karnataka (IN); Rajagopal Govindakrishnan, Bangalore (IN)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/342,490

(22) Filed: Jun. 29, 1999

(51) Int. Cl.$^7$ ............................................... G06F 15/16
(52) U.S. Cl. ...................... 709/200; 709/201; 709/202; 707/10; 707/104.1
(58) Field of Search ................................. 709/200–202; 707/10, 104.1; 370/465, 328

(56) References Cited

U.S. PATENT DOCUMENTS

| | | | | |
|---|---|---|---|---|
| 5,638,494 A | * | 6/1997 | Pinard et al. ............... | 709/202 |
| 5,655,081 A | * | 8/1997 | Bonnell et al. ............. | 709/202 |
| 5,719,786 A | * | 2/1998 | Nelson et al. .............. | 345/716 |
| 6,049,819 A | * | 4/2000 | Buckle et al. ............... | 707/10 |
| 6,151,309 A | * | 11/2000 | Busuioc et al. ............. | 370/328 |
| 6,226,666 B1 | * | 5/2001 | Chang et al. .......... | 379/100.08 |
| 6,243,396 B1 | * | 6/2001 | Somers ....................... | 370/465 |
| 6,266,805 B1 | * | 7/2001 | Nwana et al. ............... | 714/35 |
| 6,330,586 B1 | * | 12/2001 | Yates et al. .............. | 707/104.1 |
| 6,405,215 B1 | * | 6/2002 | Yaung ..................... | 707/104.1 |
| 6,460,037 B1 | * | 10/2002 | Weiss et al. ................. | 707/10 |

\* cited by examiner

Primary Examiner—Nabil El-Hady
(74) Attorney, Agent, or Firm—Joseph S. Tripoli; Harvey D. Fried; Francis A. Davenport

(57) ABSTRACT

Associative management of distributed multimedia assets and associated resources using multi-domain agent-based communication between heterogeneous peers is achieved using an Asset/Resource Management (ARM) platform architecture that has an ARM Framework that is used by Asset Management Agents. The ARM Framework includes an ARM Infrastructure which is a system of protocols and libraries from which communities of agents that are grouped in logical Agent Domains are built. The agents communicate via the KQML language embedded within TCP/IP messages, advertise their capabilities and cooperate together to perform meaningful work. An XML-based language is used to embed "content" within the KQML language, providing a self-describing data representation using various character sets. The ARM Framework includes system agents including in each Agent Domain a Resolver for keeping track of asset logical locations, an Agent Name Server (ANS) for keeping track of security access to the assets, and the "Yellow Pages" containing the Advertised System Knowledge (ASK) agent for keeping track of the capabilities of the Asset Management Agents.

28 Claims, 5 Drawing Sheets

ASSOCIATIVE MANAGEMENT OF MULTIMEDIA ASSETS AND ASSOCIATED RESOURCES USING MULTI-DOMAIN AGENT-BASED COMMUNICATION BETWEEN HETEROGENEOUS PEERS

STATEMENT REGARDING FEDERALLY SPONSORED RESEARCH OR DEVELOPMENT

This invention was developed under a federally sponsored research project, and the United States Government has certain rights as specified in the United States Department of Commerce Contract Number 70NANB5H1176.

BACKGROUND OF THE INVENTION

The present invention relates to multimedia systems, and more particularly to the associative management of distributed multimedia assets and associated resources using multi-domain agent-based communication between heterogeneous peers.

The convergence of computer technology with the traditional "media" industries, such as broadcast television, has resulted in a jumbled assortment of products and applications that do not work well together. Multimedia products and applications seek to blend conventional computer data files and text data with audio and video sequences. Although the integration of digital encoding and storage technologies is adding new operational efficiencies, methods of managing these multimedia resources need to be upgraded to take full advantage of these new operating efficiencies.

One example is the modern television broadcast facility which has various types of components from different manufacturers that must be integrated to create an efficient, reliable environment for acquisition, production, transmission and archival of material, as shown in FIG. 1. Acquisition Devices acquire incoming source material and store it for later use. This material may range from programs and commercials in an on-air environment, to raw news feeds and digitized field tape material in the newsroom, to live material coming from cameras in a live or sports production environment. Editing Systems are applications and associated devices that allow the manipulation of source material into an edited piece, often referred to as a composition. Various types of editing applications exist, from simple "trimming" applications used in on-air environments to "cuts-only" editors found in news and sports all the way to advanced post-production editors supporting 3D effects, multi-layered compositing, etc. Transmission Devices take the final output from the editing applications, and sometimes directly from the acquisition devices, and plays it to air. These devices are the workhorses of the station and are distinguished primarily by attributes of high availability, reliability and quality. Archives store material for later use. Since the amount of online storage is insufficient to handle all material in a system, an archive is required to store that material, either "near-line" for relatively rapid retrieval of material likely to be needed in the near future or "off-line" for material that is infrequently, if ever, needed. These archives range widely in size, all the way up to video libraries in news departments at the major networks of over 100,000 hours of storage. Control Devices are the brains of the facility and automatically control acquisition, transmission and archival devices in the facility. They also contain and manage databases of the material in the facility. Two important types of control systems found in broadcast facilities are Broadcast Automation/Control Systems that control on-air operations and Newsroom Computer Systems that control news operations.

Low-Resolution Video is a practical solution to the problem of storage costs and bandwidth limitations that make 100% reliable, highest resolution media unavailable to all interested users at a minimum cost. To make digital, non-linear production the norm in broadcast, the requirements of the production processes from acquisition to archive must be met in a practical and cost effective manner. To meet this need low-resolution encoders that generate "shadow" material and associated servers that present the "shadow" material to users have recently become available and solutions integrating them into the broadcast facility are highly sought after.

Catalogers also meet the needs of cost-conscious managers who are focused on operating at a high level of efficiency with a minimum of overhead. With the constant pressure to provide higher qualities of service to their customers, managers are led to technologies that add value without extracting a recurring cost. Catalogers are an example of such a technology, as they automatically generate or extract metadata regarding video/audio material and store it for later use without the need for manual intervention. This metadata enables faster location and identification of material for use in the production of news stories and other types of finished products. Various types of catalogers exist offering features such as automatic creation of "thumbnail" images based on intelligent scene-change detection algorithms, translation of speech to text using advanced algorithms on today's fast processors, and even scene and face-recognition. The list of technologies and products in this area is sure to grow in the future. In addition other metadata actually generated by the cameraperson, editor or journalist at the source of the material's production, such as geospatial coordinates, work notes, etc., will grow and be managed by these systems.

All these components are responsible for managing multimedia assets and associated metadata—but no "language" exists to provide a single, unified view of the material that allows users to easily locate and access all this material. This unified, logical view is required not only by the traditional "video jockeys", such as editors and librarians, but also by other facility personnel, such as sales, marketing and management, and even people outside the facility, such as researchers. Clearly there exists a need for an Asset Management System that provides this unification.

Various different types of Asset Management Systems attempt to address these problems. Most Broadcast Automation System vendors, such as Louth and Odetics, provide Media Management for on-air operations and some also address news production as well. Several other companies, such as Silicon Graphics and Cinebase, have developed Asset Management Systems that are targeted at post-production facilities. Some of these systems are designed to be open, an important attribute. But very few address the issues involved when post-production, live/sports/news production and on-air transmission must interact. Even fewer address the problems encountered when these various assets are distributed across wide geographies. None do so in an open, scalable, fault-tolerant peer-to-peer environment.

A common approach in current systems is a client-server architecture. These systems require that distributed devices copy their metadata and sometimes even content to a central repository. The result is a system that is too unwieldy and expensive, or that requires that the applications at the assets give up abilities that currently exist within the Asset Management System.

Another common approach is an object-oriented architecture. Object-oriented architectures are excellent for building systems, either client-server or distributed, with predefined behavior through specification of interfaces via an Interface Definition Language (IDL). However this rigor is not conducive to flexible, extensible, dynamically configurable systems since the defined interfaces are early-bound and application specific—the introduction of new messages often causes the entire system to be rebuilt. To be truly extensible, a unified system for global sharing of information needs to provide a common language for exchanging data that is self-describing and of any character set.

The use of agent-based technology for information management is being investigated by ARPA's Knowledge Sharing Effort. The KQML language specification is a result of this investigation. The InfoSleuth technology (mcc.com/project/infosleuth) is one example of a KQML-based system for distributed knowledge sharing. However these efforts do not include allowing users to locate assets through various means, exposing information about these assets via a standard cross-platform data exchange language, maintaining synchronization of logically equivalent multimedia assets, providing the ability to trace relationships between assets stored in heterogeneous systems, allowing manipulation of assets by users and administrators including indirect manipulation via the user of "proxy" assets, providing a security model that restricts access and control to certain individuals or groups, allowing assets to be transferred between nodes in the system, or supporting the integration of third-party encoders, metadata generators/extractors, databases, storage servers and search engines. All these capabilities are necessary for a distributed multimedia asset management system.

Agent technology is different from client-server technology in that software agents work as peers to perform a task by delegating parts of the task to neighboring agents. The client-server model has a clear hierarchy that is not peer-to-peer and does not collectively perform tasks by delegation. Agent technology also is different from object-oriented technologies in the commitment to an application-independent protocol of typed messages. KQML agents could have been implemented using object-oriented technologies, but object-oriented programming does not make any commitment to such a protocol.

Agent technology allows each subsystem to be encapsulated in a common knowledge representation format. Information taxonomy in the system is expressed in the common representation. Agents within the system find other agents that share the taxonomy and thus share knowledge and collaborate in the performance of tasks. Using a type peer-to-peer protocol between agents allows the horizontal extension of "the system" to share knowledge and task execution between agents across boundaries, such as networks, subsystems, facilities and organizations. In this way a system has a distributed set of resources and services that collaborate to perform tasks. There is no single point of control and no hierarchy as in the client-server model.

What is desired is a method and system for associative management of distributed multimedia assets and associated resources using multi-domain agent-based communication between heterogeneous peers.

BRIEF SUMMARY OF THE INVENTION

Accordingly the present invention provides associative management of distributed multimedia assets and associated resources by using multi-domain agent-based communication between heterogeneous peers. An Asset/Resource Management (ARM) platform architecture has an ARM Framework that is used by Asset Management Agents. The ARM Framework includes an ARM Infrastructure which is a system of protocols and libraries from which communities of agents that are grouped in logical Agent Domains are built. The agents communicate via the KQML language embedded within TCP/IP messages, advertise their capabilities and cooperate together to perform meaningful work. The XML language is used to embed "content" within the KQML language, providing a self-describing data representation using various character sets. The ARM Framework includes system agents that include in each Agent Domain a Resolver, an Agent Name Server (ANS) and the "Yellow Pages" containing the Advertised System Knowledge (ASK) agent. The Resolver tracks assets in the system, providing a logical-to-physical mapping of URN to URL. The ASK agent maintains the agent system knowledge base and contains information registered with it by each agent that provides services in the Agent Domain. The ANS agent manages security in the ARM Framework. The Asset Management Agents include Resource Brokers that represent servers and translate asset metadata and service definitions on those assets to a common XML-based Data Exchange and Query language. There currently are four classes of service: Metadata, Content, Query and Transfer. The Asset Management Agents also include User Agents, which are intelligent agents acting as a helper to applications and providing a doorway to the Asset Management Agents community. Capture Services, which are not agent-based, allow material to be captured into the system. A key function of these services is to ensure that logically equivalent multimedia assets are synchronized in time, allowing navigation between them in the time domain.

The objects, advantages and other novel features of the present invention are apparent from the following detailed description when read in conjunction with the appended claims and attached drawing.

DETAILED DESCRIPTION OF THE INVENTION

Figure 2:
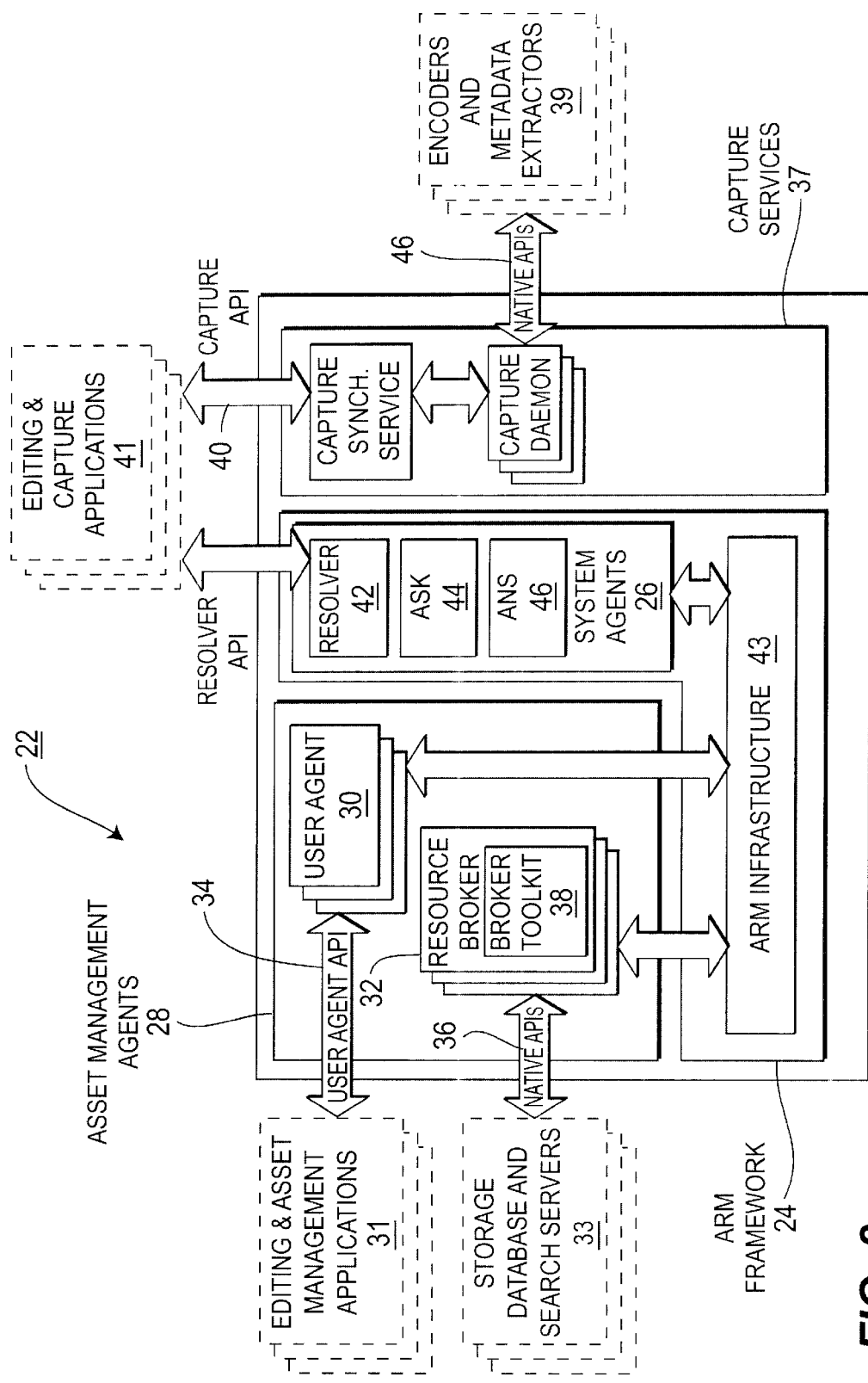
FIG. 2 is a block diagram view of an Asset/Resource Management (ARM) platform architecture according to the present invention.

An Asset/Resource Management (ARM) platform architecture 22 is shown in FIG. 2 having three major parts. An ARM Framework 24 provides the technological infrastructure upon which all agents are built, and has several key System Agents 26 that provide a framework for agent communities. Asset Management Agents 28 are built on top of the ARM Framework 24 and solve the Asset Management problem itself. These agents have two general classes: User Agents 30 that represent end-user applications 31 and Resource Brokers 32 that represent resource servers 33 such as Storage Devices, Databases and Search Engines. A User Agent Application Interface (API) 34 allows applications to access the ARM platform functionality. A Resource Broker Toolkit 38 allows developers to build Resource Brokers. Native APIs 36 allow developers and vendors to integrate their products with the ARM platform. Capture Services 37 are based on more traditional, non-agent, technologies, providing low-latency interfaces for integrating and synchronizing third party encoding and metadata generation or extraction products 39. A Capture Synchronization API 40 provides for integrating synchronized capture of low-resolution and automatically-generated metadata into existing high-resolution capture applications 41, as well as a standardized Capture Daemon API 47 allowing independent software vendors to integrate their products with the ARM platform.

The ARM Framework 24 is a collection of executables and libraries that provide fundamental components for building distributed applications using software agent technology. The term "agent" refers to an autonomous process running on some processor in a system, which communicates with other agents in the system via message passing. Agents in the ARM Framework are somewhat more specialized than the general case—they understand an agent-oriented language, in this case Knowledge Query Manipulation Language (KQML), and can communicate with any other agent regardless of its knowledge store. Each agent knows what it is capable of speaking about and can articulate this to other agents. Given this capability, agents advertise their abilities, which in turn attracts other agents capable of performing meaningful work. Agents cooperate with each other by doing their best to fulfill requests and advertise only that which they can fulfill. The set of all agents is an agent community.

Software agents work as peers to perform a task by delegating parts of the task to neighboring agents. Using a typed peer-to-peer protocol between agents allows the horizontal extension of "the system" to share knowledge and task execution between agents across boundaries, such as networks, subsystems, facilities and organizations. There is no single point of control and no hierarchy, as in the client-server model, but rather a distributed set of resources and services that collaborate to perform tasks.

Agent technology is effective as "glue", forming a wrapper around an existing system. Agents called Resource Brokers 32 are wrappers around databases or devices that communicate information using common terms understood by other agents. This accomplishes two important things: 1) the storage format and API of the database/device is factored out; and 2) the information in the system may be formalized to a point where other agents may be built to browse or modify the data in a uniform way. Several Resource Brokers exist in any real system, and all have different underlying databases. Yet they share data and serve requests from other agents in the system via the common language.

All aspects of this agent architecture need to support a distributed system. To do this, each element of the architecture is examined for uniqueness. The test is to scale the system to global size and ask if there is still a central component to the whole system. The answer should be NO. Two logical domains or facilities may be glued together at the "seams" to form a larger system without having a hierarchy.

Figure 3:
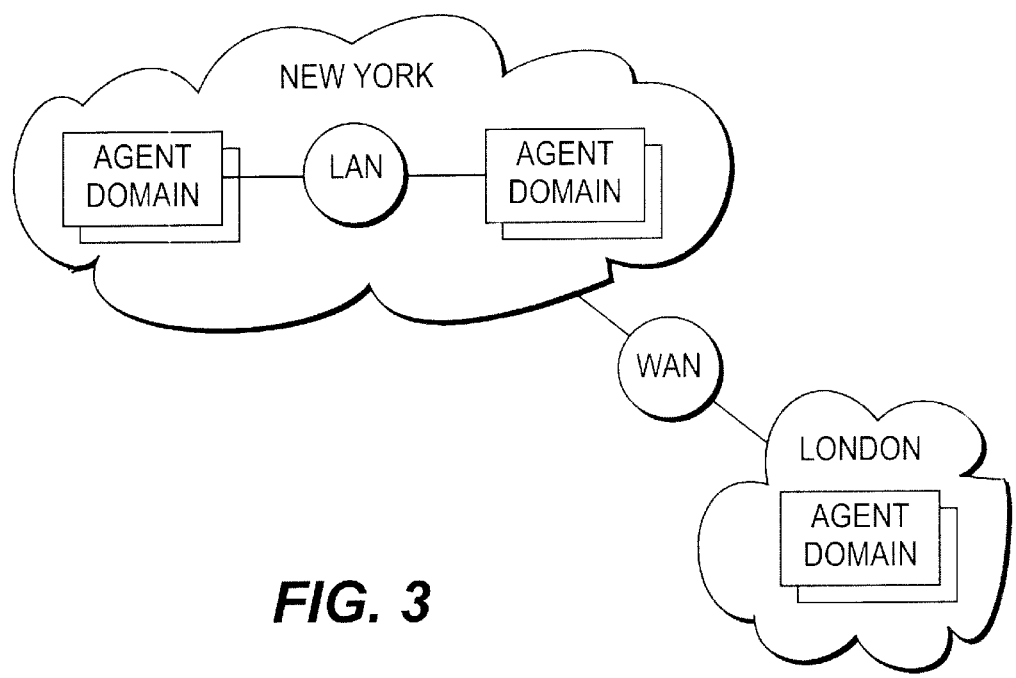
FIG. 3 is a logical diagram view of multiple Agent Domains according to the present invention.

Systems built on top of this framework vary in size, and the organizations for which they serve differ significantly in structure. For this reason agent systems are divided into multiple Agent Domains. Agent Domain divisions may be based on geographical divisions such as "London" vs. "New York", business units such as "Entertainment vs. "News", or along any other lines suggested by the logical or physical layout of existing systems. Agents typically communicate with a single domain, however support for inter-domain communication is provided. Agent Domains are used to divide the namespaces of identities, both user and agent names, and of groups; such names need to be unique only within a single Agent Domain. This means that wherever such names are used, they are qualified by an Agent Domain name, either implicitly or explicitly. FIG. 3 shows three Agent Domains sharing information across local and wide area networks.

The ARM platform 22 uses mostly standard and well-known technologies. Agents within the ARM platform communicate via asynchronous exchange of ASCII messages over TCP/IP sockets. TCP/IP is generally the transport protocol of choice in today's computer networking world, although it is not well suited for low-latency, realtime control usage such as point-to-point serial protocols that are traditionally used in the broadcast industry. KQML, Knowledge Query Manipulation Language, is a message protocol and format for software agents to communicate with each other. All messages passed between agents in the ARM platform are expressed in KQML format. KQML enables autonomous and asynchronous agents to share information and to work toward solving problems in a cooperative manner. KQML is part of a larger effort, the ARPA Knowledge Sharing Effort, aimed at developing techniques and methodology for building large-scale knowledge bases that are shareable and reusable. KQML defines the primitives of the conversation with performatives such as "tell", "ask-one", "recommend", "broker-one" and "forward". Performatives are combined with actual sentence content, carried by the performative, which is expressed in a content language. In addition to providing request performatives, KQML also provides subscription performatives supporting asynchronous notification.

KQML is not sufficient to solve the need for a standardized data exchange format. The Extensible Markup Language (XML) is used as a standard language to describe and exchange various types of information. Detailed information is available at xml.com. This content language is transparently carried by the KQML protocol and represents queries, search results, clip details, script information, etc. In XML all data is represented in ASCII strings, in a manner similar to that fund on an HTML web page. The structure of XML data is application specific and is defined using a Document Type Definition (DTD); structures represented in XML are referred to as documents. In addition to defining the structure of documents, the ARM Framework's ASK agent 44 uses XML DTDs to provide the mechanism by which agents advertise their services to the agent community. Supporting the XML language is an XML validating parser, which makes it easy to develop software that processes XML documents. XML parsers translate the XML data to/from software "documents" that are manipulated by agents, and ensure that the XML is both "well-formed", i.e., conforming to the basic XML syntax, and "valid", i.e., conforming to the corresponding DTD. Asset Management Agents 28 also are based on XML, but have enhanced this common content language to support modeling of objects and rich queries.

Figure 4:
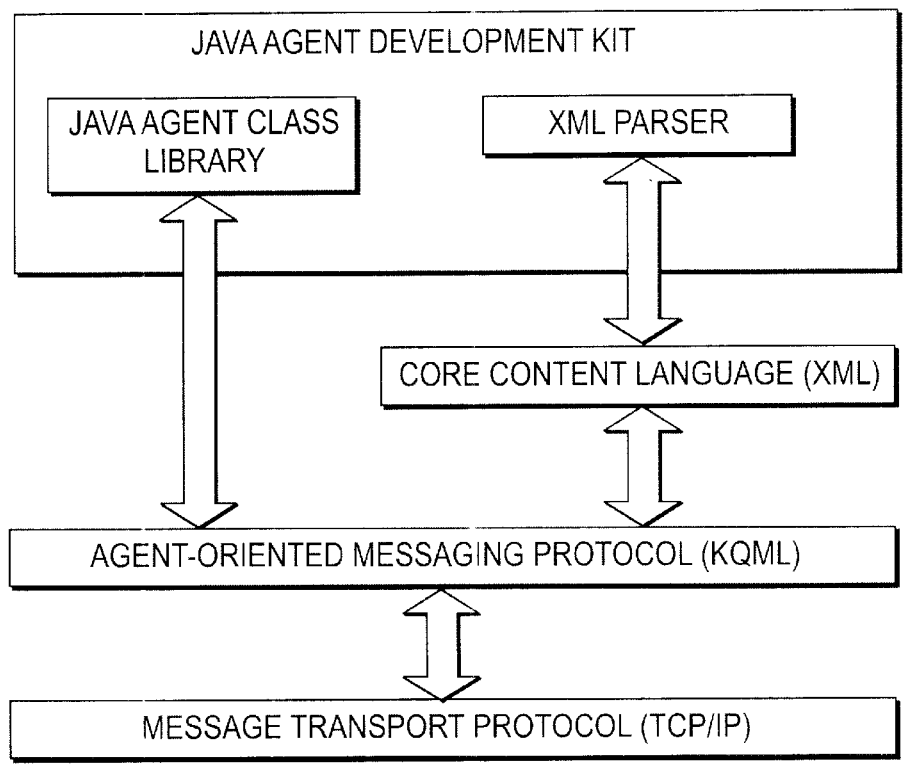
FIG. 4 is a logical diagram view of the software architecture for the ARM Infrastructure according to the present invention.

To enable the rapid development of Agents that interact with the ARM Infrastructure 43, a toolkit is provided that includes, for this example, a Java Agent Class Library, software for transporting/interpreting XML and KQML messages, and an XML parser, as shown in FIG. 4. Java offers a cross-platform environment for developing agents/brokers. The ARM Infrastructure is basically a KQML message transport mechanism where the KQML protocol resides, with the agents/brokers written on top of it in Java. The Resolver 42, which is not by itself an agent, tracks assets in the system and provides "location independence", elevating the user's model of the system's material to a logical level as opposed to the physical asset level. Location Independence associates copies of material, including identical copies, similar representations at different compression levels, or even vastly different representations, that are logically equivalent so they may be presented as one logical entity to users. This allows metadata about the logical entity, and potentially any individual copy, to be used for all copies. An example of the power of Location Independence is the building of Edit Decision Lists (EDLs) based on low-resolution material without knowledge of where the high-resolution material resides—knowledge that is not needed until conformance occurs at a later time and knowledge that may change as assets migrate around the system. When assets reside in multiple places, i.e., in an on-line server as well as an off-line archive, the conformance process selects the most appropriate location.

Figure 1:
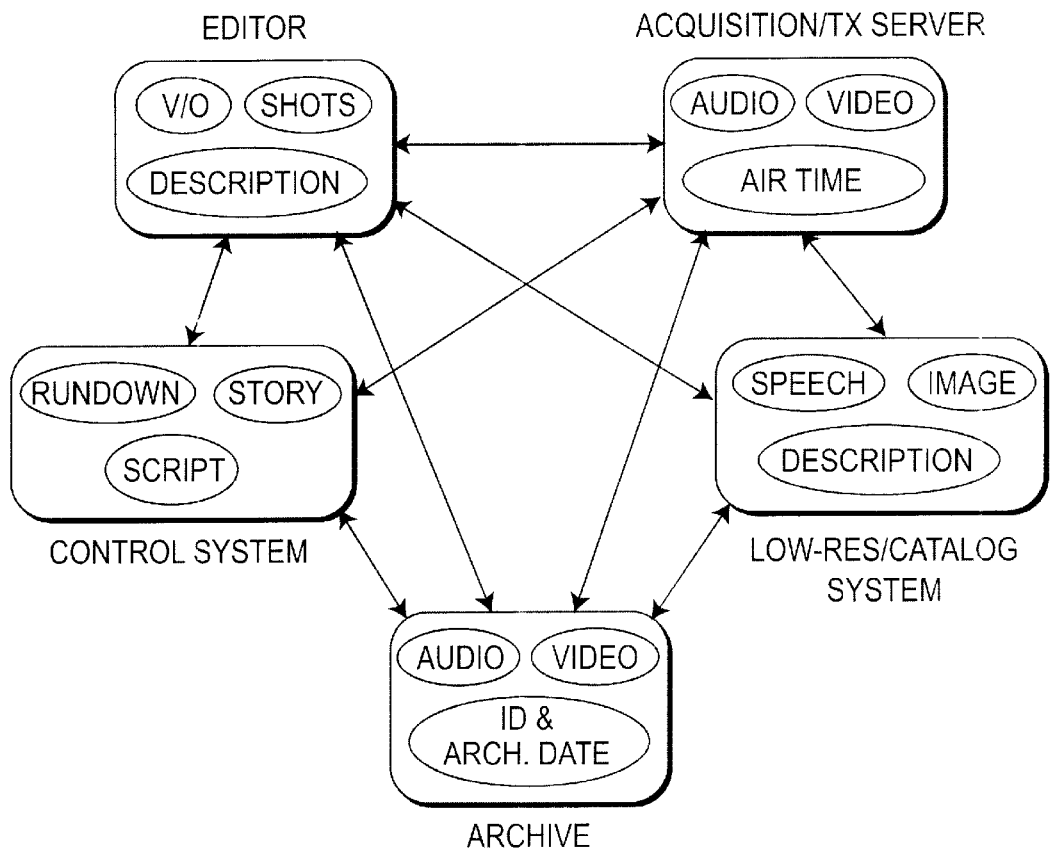
FIG. 1 is a logic diagram view of a distributed multimedia environment.
Figure 5:
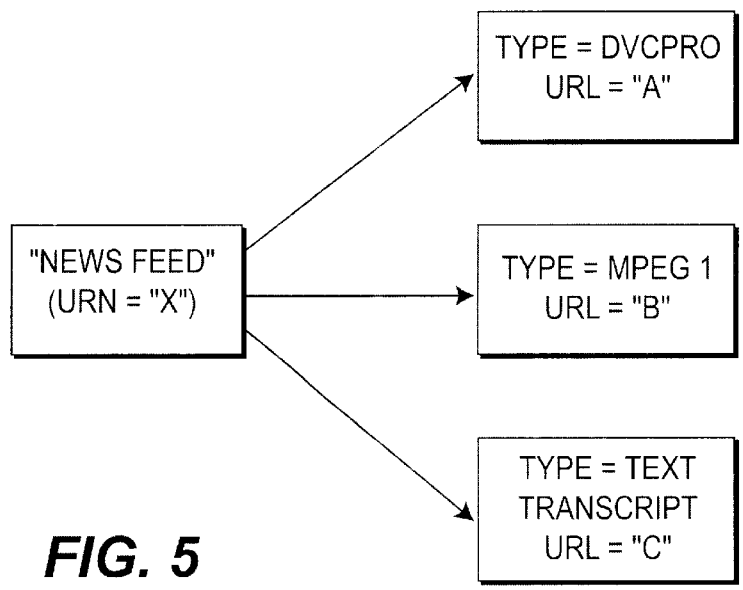
FIG. 5 is an illustrative logical diagram view of one-to-many mapping according to the present invention.

Location Independence is accomplished by a logical to physical translation that is enabled by a one-to-many mapping of Universal Resource Name (URN) to Universal Resource Locator (URL). Every independently addressable asset in the system has a URL and an associated data type; sets of assets in the system that are logically equivalent share a URN, i.e., a five-minute news feed (URN="X") with equivalent high-resolution material (URL="A"), a "shadow" low-resolution version (URL="B") and a text transcript where each word is time stamped with SMPTE timecode (URL="C") as shown in FIG. 5.

To support the architectural requirements to scale to a global scope, the Resolver 42 supports Distributed Naming Authorities (DNA). In a system similar to the Internet Distributed Naming Service (DNS), each Agent Domain provides a single Resolver that acts as the Naming Authority for that Agent Domain. Resolvers may locate other Resolvers in the system to perform a distributed, system-wide lookup of URNs. However unlike DNS, Resolvers create URNs on the fly, transparent to system users, and the system of Resolvers is not strictly hierarchical but rather peer-to-peer.

Several concepts are fundamental to URNs. First they are immutable, meaning that once assigned they cannot be changed. This immutability means that references to URNs may safely be added to applications without concern that references will be lost; and that the assets themselves may move in the system without modifying references to their URN. Secondly URNs are globally unique, a requirement to enable a view of data that could span large data sets. Therefore URNs have the following format:

NA:UID:REV where NA is the Resolver Naming Authority and UID is a unique identification, forming the globally unique portion, and REV is a Revision Number. The Naming Authority portion of the URN is defined at system configuration time for each Resolver and is unique throughout all Agent Domains. The UID is generated when a URN is created and is unique to a particular Resolver. Both the NA+UID guarantee a globally unique identification for all Agent Domains. The REV portion identifies the current revision number for the URN. The URN format is not parsed by any other application except for the Resolver; rather applications use the services supported by the Resolver to access the component parts of a URN.

Resolver URNs include Revision Numbers, not to provide revision management, but rather to allow revision tracking. Revision tracking allows a particular piece of metadata to be related to several different versions of an asset. For example, a description field in a data base ("news story about airplane crash") may apply to several different edited versions of the story, i.e., the original version on the 11:00 news as well as the re-purposed version that airs the next morning. The Resolver does not track any type of branching—this is the responsibility of the individual Resource Brokers 32. It is up to the application to determine when to create a new URN or to create a new version of an existing URN.

URLs usually identify physical assets and represent the physical locations of the assets. URLs may also represent URN-like (logical) names in systems that already provide for them. This provision supports systems that already have existing logical name formats in spite of the Resolver's private URN format. Unlike URNs, URLs have no requirement to be immutable since they are often based upon file names or IDs that may change. If the URL does change, the Resource Broker 32 needs to update the Resolver 42. Like URNs, URLs are also globally unique. URLs that represent assets and are registered with the Resolver by Resource Brokers include information so that any agent in the system may derive the location of the Resource Broker that "manages" that resource. A URL has the following format:

AGENT DOMAIN:DEVICE:LOCATION:ASSET NAME

The AGENT DOMAIN and DEVICE define the Resource Broker address, and the LOCATION and ASSET NAME define the broker-relative asset name. Broker-relative asset names are expressed in the native naming system for that particular device, so many different formats are expected.

All URLs have an associated creator, i.e., agent name, etc. Only the URL creator may modify or delete the URL. This model assures that URLs are not deleted or modified without consent from the application that placed it there. The application may then determine if a user has appropriate privileges to perform the requested command.

The component responsible for maintaining the agent system knowledge base is the Advertise System Knowledge (ASK) system agent 44, also known as the "Yellow Pages". The ASK agent contains information registered with it by each agent that provides services in the Agent Domain. It provides for dynamic configuration of agents in the system. Like the Resolver, there is only one ASK agent per Agent Domain. Upon power up all other agents advertise their capabilities with the ASK agent using an application ontology (content language). The ASK agent also loads certain fixed ontologies based on static configuration. The ASK agent then answers queries and recommendations about services provided by the other agents in the system. The ASK agent advertises their services across Agent Domain boundaries and provides a discovery mechanism outside of a facility or specific system Agent Domain. The ASK agent provides a broker service, called recruiting, that dispatches requests from one agent to another based on matching advertised content with requested content. The ASK agent forwards the request to the appropriate agent(s), which in turn individually process the request and respond directly to the requesting agent.

The Agent Namer Server (ANS) agent 46 manages security in the ARM platform. The ANS agent accepts logins from every agent within a single Agent Domain. The ANS agent maintains the status of each agent, including login state (online or offline), agent type (user or resource) and additionally passwords for each agent representing a user. This information is helpful to a system administrator or another agent that needs to broadcast a message to all agents that are online. Every agent is required to login and identify themselves and the Agent Domain of which they are a part to the ANS agent at power-up before performing any other task. Certain agents representing users need also to send passwords. A system administrator pre-registers all agent identities, agent type, group privileges and a user password in the case of user type assets. If an agent sends a login with an incorrect password or an unregistered identity, it receives a KQML "sorry" reply. If an agent successfully logs into the system, the ANS agent returns the agent's authority. When an agent receives its authority from the ANS agent, it includes this in all subsequent messages it sends to any other agent. Agents do not parse this information directly or try to make decisions based on the structure of the message. Rather the Java Agent Class Library provides an API for accessing authority settings.

Every agent message is signed by an identity and annotated with a set of access groups to which that identity belongs. The sending agent is responsible for guaranteeing that the identity is being properly used, i.e., that the human user owning the identity has logged in properly and that the access groups do contain that identity. The identity is used primarily for audit trail generation; the groups are used for access control. This information may be omitted from systems where security support is not desired.

Access control to resources is based on the notion of access groups. Each identity in the agent system belongs to one or more groups, and every message is annotated with some subset of the groups to which its signing identity belongs. Access to each resource in the system is given by an access control list (ACL) that describes the kind of access permitted to each group.

Figure 6:
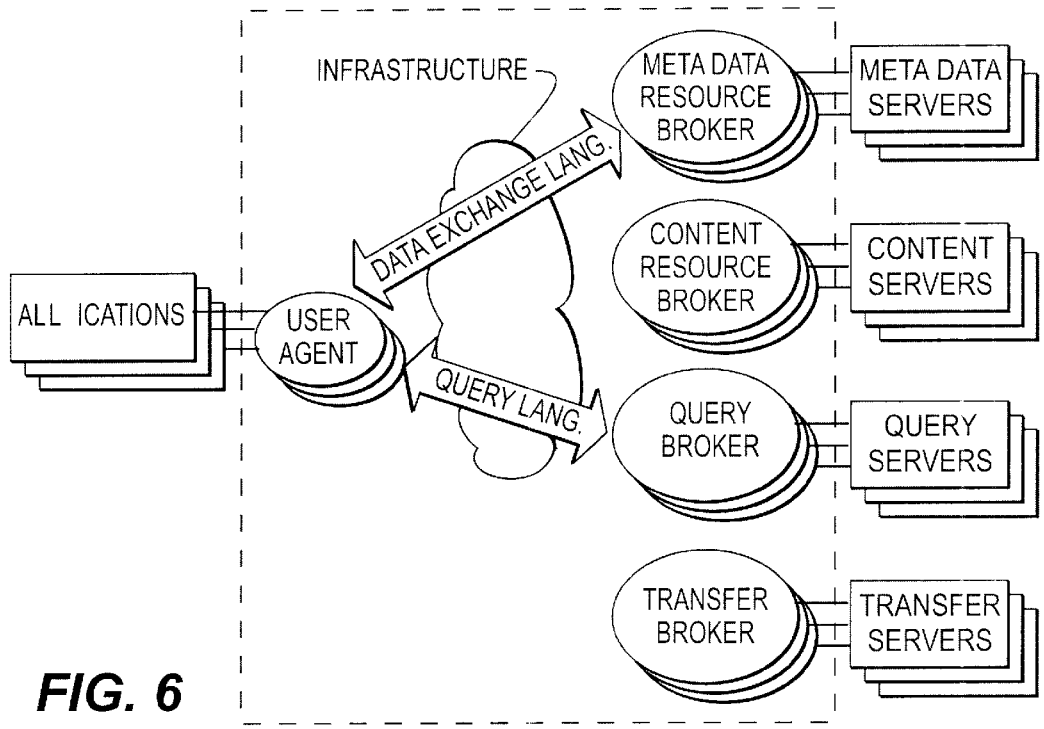
FIG. 6 is a logical diagram view of the Asset Management Agent community according to the present invention.

The Asset Management Agent Community 28 is targeted at managing primarily assets, and for this example assets in the broadcast environment such as video clips, scripts, sound clips, EDLs, playlists, etc. As shown in FIG. 6, the three logical components of the Asset Management Agent Community are Resource Brokers that serve as wrappers around specialized classes of assets or services and associated functionality, User Agents that represent a user or application and carry on conversations with Resource Brokers to accomplish tasks, and Content Languages (XML Applications) that support Data Exchange and Querying.

Although XML is an important ARM platform underpinning, XML lacks standardized semantics allowing meaningful machine-to-machine exchange of information without prior knowledge of the data's structure. This is crucial to a system that supports a wide variety of data without being tied to a particular data schema. Therefore two additional Content Languages are used. These languages are XML Applications, which are languages built upon XML. Standard XML parsers are software tools that are leveraged by these additional content languages. XML does provided the underpinnings upon which such languages are expressed via standardized DTDs. The Asset Management Agents 28 are based on two proposed languages that meet the needs outlined below. Another general goal is that these languages interoperate with the content languages specified by other vendor Media Management specifications, such as the Avid Open Media Management specification. These additional Content languages are Standardized XML-based Data Exchange Language (SOX) and Standardized XML-based Query Language (XML-QL). For further details see the notes "Schema for Object-oriented XML" and "XML-QL: A Query Language for XML" at w3.org/TR.

A Data Exchange Language needs to express the semantics of object-oriented data, decreasing the complexity of supporting interoperation among heterogeneous applications. Unlike XML, which defines structures where strings are the only native data type, this language needs to be able to model any object using standard data types (integer, string and date, for example), specify any constraint on data members (a range of valid values for date, for example), express references between objects (a newsroom rundown references an EDL, for example) and be compatible with existing object definitions (such as the Avid Open Media Management specification). SOX (Schema for Object-oriented XML) defines basic intrinsic datatypes, an extensible datatyping mechanism, content model and attribute interface inheritance, a powerful namespace mechanism and embedded documentation. SOX facilitates software mapping from SOX documents into data structures in relational databases, common programming languages and interface definition languages, such as Java, IDL, COM, C and C++, resulting in reusable code.

In addition to a Data Exchange language, a language is needed for expressing queries for intuitive text search and schema-based search on assets and database engines of many different types. Database engine types are supported to include Text Search Engines, "homegrown" databases of various types, and future XML databases. Additionally this language supports a single search expression that spans multiple different data sources. Finally queries may be easily converted to standard SQL/OQL queries to support legacy databases. This language is based on XML, such as the XML-QL language.

Resource Brokers 32 provide services to client applications and the User Agent 30. Resource Brokers represent servers, such as storage devices, databases or other servers, on one side and speak the common SOX Data Exchange language on the other side, allowing various types of Resource Brokers and Agents to work together in a distributed environment. In today's broadcast environment, for example, Resource Brokers interface with and run on hardware including asset management systems, automation control systems, catalog systems, newsroom automation systems, editing platforms, video disk servers, low-resolution video servers, networked data tape libraries, etc.

Resource Brokers 32 are built using a Broker Toolkit 38, which is based upon the Java Agent Development Kit in this embodiment, and have three types of services: general services; service classes; and optional service class specializations.

Resource Brokers have certain general attributes, independent of the type of service they provide. As ARM platform agents, Resource Brokers communicate with other agents via KQML and advertise the services they provide with the ASK agent and update the Resolver when assets are created/modified/deleted. URLs are used as operands for Resource Broker services. These URLs uniquely identify within the scope of a particular Resource Broker the asset to be acted upon. Access control for each asset identified by a URL is the responsibility of the Resource Broker managing an asset—the broker determines what sorts of access are valid and may limit certain actions. All Resource Brokers adhere to the same basic access control model. Each Resource Broker is responsible for controlling access to the URLs that it manages. Typically it has its own database, mapping URLs or collections of them to group-based ACLs. However the model also allows for use of existing security schemes, in which case the Resource Broker is responsible for mapping the user/group name onto the native system's user/group name. The granularity of the ACLs is up to the Resource Broker—all the way from allowing any operation on any object from a particular user to individual ACLs for each object managed by the Resource Broker.

Resource Brokers provide various types of service classes, and a single Resource Broker may provide more than one service class. Currently four such service classes are Metadata, Query, Content and Transfer. Resource Brokers are often known by their primary service class name. Thus at a system description level, there are often references to Metadata Resource Brokers, Transfer Brokers, etc. This nomenclature does not imply these Resource Brokers do not provide other secondary service classes. The following table depicts several possible Resource Broker configurations:

| Resource Broker Service Class Configuration | Server Description |
| --- | --- |
| Metadata | Simple Metadata database, i.e., a flat-file database |
| Metadata, Query | Metadata database supporting queries, i.e., SQL-compliant database |
| Metadata, Query, Content | Database encompassing content and metadata w/search capability |
| Metadata, Content, Transfer | Networked storage device w/simple database |
| Metadata, Content, Transfer, Query | Networked storage device w/database and search |
| Metadata, Content | Non-networked storage device |

In addition to omnipresent services offered by all brokers providing a particular service class, specialized services may be provided representing features that are unique to assets managed by or services provided by a particular Resource Broker. By providing metadata services a Resource Broker provides access to the metadata it contains and manages— exposing that information for access by other agents. Access to metadata is provided via the SOX Data Exchange language. This access includes the ability to create, get, modify and delete metadata. A primary goal of metadata access is to accommodate development of applications that can display and edit metadata (objects) without requiring inherent knowledge of the object schema—key to the development of metadata management applications that span heterogeneous object servers. This access also includes enumeration over all assets contained therein. This enumeration includes the ability to filter the assets by name and date.

Resource Brokers may be designed to support searching on metadata via a centralized Search Engine that caches some or all of the Broker's metadata. In this case the Resource Broker updates the Search Engine whenever searchable metadata is created or changed. This is not needed if the Resource Broker is a wrapper around an existing database that provides all required search services, as long as the Resource Broker provides a Query service that exposes this functionality. As new metadata assets are renamed or deleted, the Metadata service needs to update the Resolver.

To support the rebuild and resynchronization of the Resolver for disaster recovery, the Metadata service stores the URN for each of its assets that are registered with the Resolver. Each object managed by the Metadata service exposes the URLs of the assets it references. This capability, supported by the SOX Data Exchange language, enables the traversal of object relationships throughout the system as follows: users see what objects a particular object refers to; and users see what objects refer to a particular object, which needs coordination by the intelligent User Agent that queries the entire system for references to a particular object. Interested third parties often need asynchronous notifications that metadata has been created, modified or deleted. Subscription to status notifications is used to dynamically update a display or trigger other processing. Interested third parties may register/remove interest in notifications at any time.

Based on an analysis of existing servers the following specialized metadata service is envisioned. Certain assets in broadcast, such as Scripts and EDLs, may be managed in a version control system. In this case the Metadata service provides an interface to a checkin/checkout functionality provided therein. Whenever new versions of assets are created, the Resource Broker creates a new URL and registers it along with a new URN with the Resolver. The new URN contains the same NA and UID as that of the previous version of the asset, but the REV is incremented. This ensures that the new asset is uniquely identified, but also that other metadata in the system that referenced the original material may now be used as metadata for the new asset as well.

The distinction between Metadata and Content is quite blurry and has multiple interpretations. In this model Metadata is defined as "data that refers to something else via URN or URL." Content is generally defined as "the terminal node in the graph of all asset references." For example, newsroom computer scripts are considered metadata since they have embedded URL references to EDLs. Likewise EDLs are considered metadata since they have references to media in the system. On the other hand, video files and word processing documents with no embedded links are considered Content. There are, of course, grey areas to this general rule—one person's content may be another person's metadata. One grey area is that content must have some associated metadata, even if it is only an ID or a file name and a file type—often this cannot be separated from the content itself. Therefore whenever a Resource Broker provides Content service, minimal Metadata services are provided as well. Another grey area is when a particular piece of content, such as MPEG-1 video, is used as a proxy for working with offline material, such as DVCPRO video, and thus is being used as metadata. To function correctly as metadata, however, the Resolver needs to associate the two, as well as the timecode that keeps the individual video frames synchronized. Therefore since an external entity has provided the URL association, the MPEG-1 video in this example does not qualify as metadata.

Content storage space is not infinite, and therefore one of the primary attributes of an asset management system is the orderly deletion from storage of material that is no longer needed. Content Resource Brokers expose this functionality in a standardized way. Some specialized Content services for optimal storage management are envisioned that may be supported by Content Resource Brokers. Partial Delete is a requirement that is unique to video content servers, both high-resolution servers like the Tektronix Profile disk recorder and low-resolution servers like the Telemedia SpectreVision server. Partial Delete allows deletion of selected content subsets without altering the remaining content from either a quality or temporal aspect. An example is the deletion of all but five minutes of an hour-long news feed. One important feature mentioned in discussions of digital media management has been euphemistically termed "Bit Rot." Bit Rot is the ability to transform the content, especially content such as media that needs large amount of storage, from one form to a more compressed form in order to conserve storage space. An example is an MPEG-1 file that initially was recorded at 1 mbps which is reduced via software transcoding to be the equivalent size of a file recorded at 50 kbps.

By providing Query services a Resource Broker accepts a query from a search client, expressed in the Common Query language, processes it and returns results. In conjunction with the ARM agent framework, this enables a global search capability. Query Brokers provide two basic query types: an intuitive text search; and a database schema-based search—at least one has to be provided. Query services are useful as wrappers either around an existing database with search capabilities or around a "search engine."

The need for intuitive text search is important when searching across the text in a document such as a newsroom script or transcripts of interviews. This type of information cannot be classified according to pre-defined keywords. Instead search needs to include synonyms, i.e., a search for "mule" must also locate "ass." This model is identical to searching for web pages via an Internet Search engine. Various different "search engines" are available on the market, but by using the generic Query service model these engines may be integrated into the system simply by developing a Query Broker for the search engine. Intuitive text search support includes the potential for searching on metadata that is expressed in foreign languages, and thus the Query service supports multi-byte character sets.

In many environments intuitive text search is not sufficient. For example in the newsroom, journalists may want to search on any story containing the word "airplane crash" which was written within the last 6 months. In this case an intuitive text search needs to be combined via a Boolean AND operation with a search on the date field within a script. To support these searching models, the Query service exposes the object types that will be searched on, as well as indicating their associated schema, if schema-based search is allowed. This enables development of generalized user interfaces that allow searching on data without inherent knowledge of a particular database's schema. An extremely powerful tool for developers and systems integrators is the definition of equivalency mappings between database schemas in heterogeneous databases. For example the "journalist" field in a script database and the "editor" field in an EDL database may be defined as equivalent. This allows the User Agent to provide a simple, dynamic user interface for searching these heterogeneous databases without having inherent knowledge of the schema. To accomplish this the equivalency mapping is defined via an XML DTD and pre-loaded by the ASK agent when the system is initialized. The ability of XML-QL to describe queries spanning heterogeneous databases supports this feature. Query Brokers also allow forward search, enabling a user to subscribe to a query so they can receive notifications as soon as new assets are added or when an asset is modified.

The KQML and XML languages provided by the ARM agents provide content transfer services sufficient to transfer metadata and content using the ubiquitous TCP/IP protocol. However this is not sufficient for transfer of all assets in all environments, such as the broadcast environment, for the following reasons.

Certain content servers do not support the TCP/IP protocol. In media-rich environments the obvious examples are the various isochronous and streaming protocols that have not yet been standardized into an industry-wide protocol. Any configuration options for these protocols need to be exposed to users in a general way.

Where content servers are involved, a third party residing elsewhere in the system often requests transfers between two servers; the transfer may occur over a different physical network. In these cases transfer cueing is often also provided.

Transfer to storage devices usually also entails other software handling which actually determines where things will be transferred to/from and physically moves the transferred content to/from physical storage.

The pre-transfer Negotiation of certain parameters is often not provided by the underlying transfer protocols.

Figure 7:
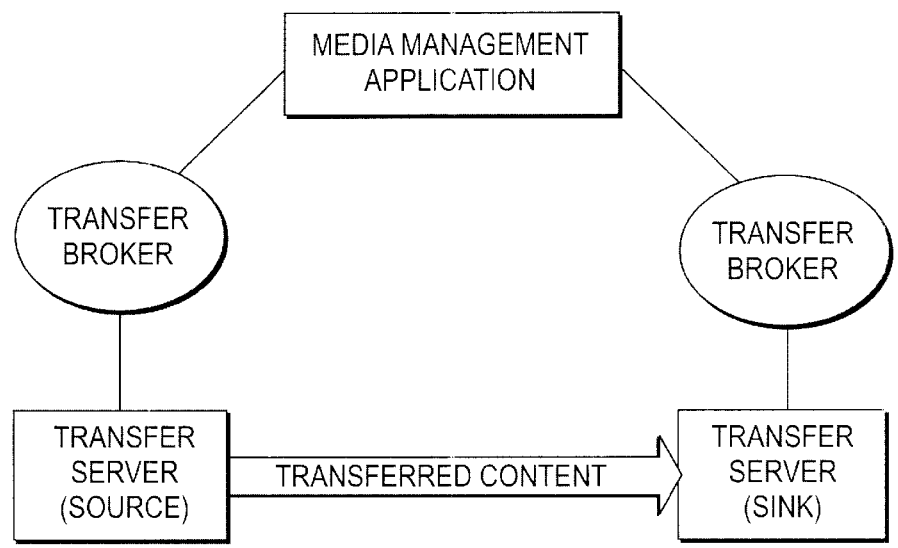
FIG. 7 is a logical diagram view of a Transfer Broker model according to the present invention.

To handle these cases a Resource Broker may provide a Transfer service. Transfer services encapsulate the underlying transfer protocol and transfer engine, allowing development of media management applications that are independent of the transfer protocols and associated engines. To accomplish a transfer there is a source Transfer Broker and a sink Transfer Broker, as shown in FIG. 7. Transfer Brokers expose basic transfer control functionality, including Submit, Stop, Pause/Resume and Cancel operations.

Transfer requesters need asynchronous notification as to the progress of the transfer. This notification includes enough information so that the time remaining and the percentage completed may be indicated to the user. Interested third parties may also register for asynchronous notification whenever transfers occur. This is most prevalent when a Transfer Broker functions as a sink. Since transfers are often a lengthy operation, Transfer Brokers indicate before a transfer occurs that a transfer has a reasonable chance of success. Not all Transfer servers can transfer content to all other transfer servers because (1) the source and sink Transfer servers do not support the same protocols, i.e., FTP v. Streaming, Push v. Pull; (2) the sink Transfer server cannot handle the content type expressed by the source Transfer server; and (3) no route exists between the source and sink Transfer servers.

Transfer Brokers functioning as sinks provide upon request information regarding the possible destinations on the sink Transfer server. This is often expressed as a directory structure or other hierarchy. This information allows a media management user application interface to display a destination list for the transfer.

Brokers representing Transfer servers that provide a transfer queue expose this functionality as a broker service—this cueing model is similar to that of a print queue. This service exposes the cue contents for manipulation by a media management application. The Stop, Pause/Resume and Cancel operations are supported on the queued contents. Security support may be provided so that User A cannot affect a transfer begun by User B.

Brokers representing Transfer servers that support prioritized transfer expose this functionality as a broker service. This is normally expressed as a priority level in the transfer submission request.

In media production environments where high-resolution video is used and transfer of that "heavy" content between devices is needed, an optimization built into Transfer servers is to only transfer material that does not already exist at the destination. An example where this is valuable is where a news editing application has transferred material and an associated EDL, together known as a "composition", to a transmission device. Right before the story is to be aired, new footage arrives that should replace a small segment of the original material. As the user requested second transfer of composition, Intelligent Transfer only sends the new material. At a minimum this capability affects the progress notifications.

The User Agent 30 is an intelligent agent acting as a helper to applications and provides a doorway to the Asset Management Agent community. The User Agent coordinates with the other agents in the system to provide features commonly needed by applications. A primary goal is to encapsulate as much functionality as possible into the User Agent to make incorporating media management functionality into editing and media management applications as simple as possible. However applications using the ARM platform may be developed without the User Agent. The User Agent provides an object-oriented programming interface allowing rapid integration into applications developed with traditional, non-agent-oriented applications. The User Agent API in this embodiment includes both Java and COM interfaces.

The User Agent performs a number of relatively monotonous tasks to support such features as Global Search, building Physical Directory and Search Views, and managing Transfers and Forward Searches. For example, during a query the User Agent:

gathers the list of queryable targets in the system and defines the available query scopes;

formats the query into the Query Content language;

distributes with the aid of the ASK agent the query to all Query Brokers in the selected query scope; and collates the asynchronously returned results, removing any duplicates.

The User Agent signs all messages it sends on behalf of a user with that user's name. The User Agent authenticates the user's identity by requesting the user's name and password at the beginning of a session and passing this information on to an ANS agent. The ANS agent consults a password database for validation, determines the agent's privileges, and returns privilege information. This privilege information is then used in all subsequent message transactions.

At a system design level the ARM Framework and Asset Management Agent community are not sufficient to provide all necessary services. Therefore a set of services not based on agent technology is provided to allow material to be captured into the system. This material may be of various forms, including high-resolution material, low-resolution material, metadata that is extracted from multimedia generally, and metadata that is algorithmically generated from multimedia material. In general these services are needed to ensure a framework where different third party encoders and catalogers may be "plugged-in" to provide specialized, value-added services independently of ARM platform-based applications.

The Encoder Capture Daemon API abstraction layer allows automation systems and capture applications to request different encoders or metadata extractors, such as the Telemedia nSPectre encoder or Tektronix Profile video disk server, to begin capturing material, including starting, stopping and specifying the URL for the newly captured material. This API's primary responsibility is to keep this material synchronized as it is being created.

The Cataloger Capture Daemon API abstraction layer allows automation systems and capture applications to control different cataloging systems, such as the Virage VideoLogger cataloger, to capture material, including starting, stopping and specifying the URL for the newly captured material.

The Capture Synchronization service module receives LAN-based commands to capture material on low-resolution encoders and catalog capture engines and ensures that the contents are synchronized with the capture of the high-resolution material. This module is designed to allow easy integration of low-resolution and catalog capture into applications that currently control the capture of high-resolution material. To ensure synchronization this layer depends upon a time-of-day clock source that is shared by all three devices. This module is not needed when the controlling system assumes responsibility for synchronizing capture.

Figure 9:
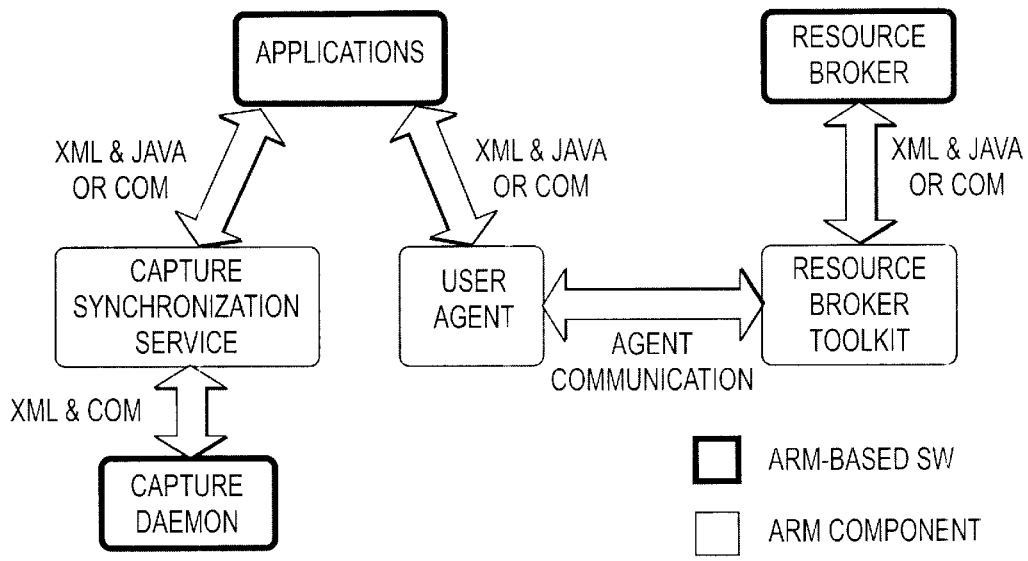
FIG. 9 is an illustrative view of software application development using the ARM platform architecture according to the present invention.

As shown in FIG. 9 there are several different types of software that may be developed within the ARM platform. Applications that are based upon the User Agent API and/or the Capture Synchronization Service may be developed in Java or COM-enabled environments, such as Microsoft Visual Basic, Microsoft Visual C++ and any Java environment. The Resource Brokers may be developed with any tool that can build Java or COM objects. Since the Capture Daemons are not agent-based, a COM interface must be provided.

Figure 8:
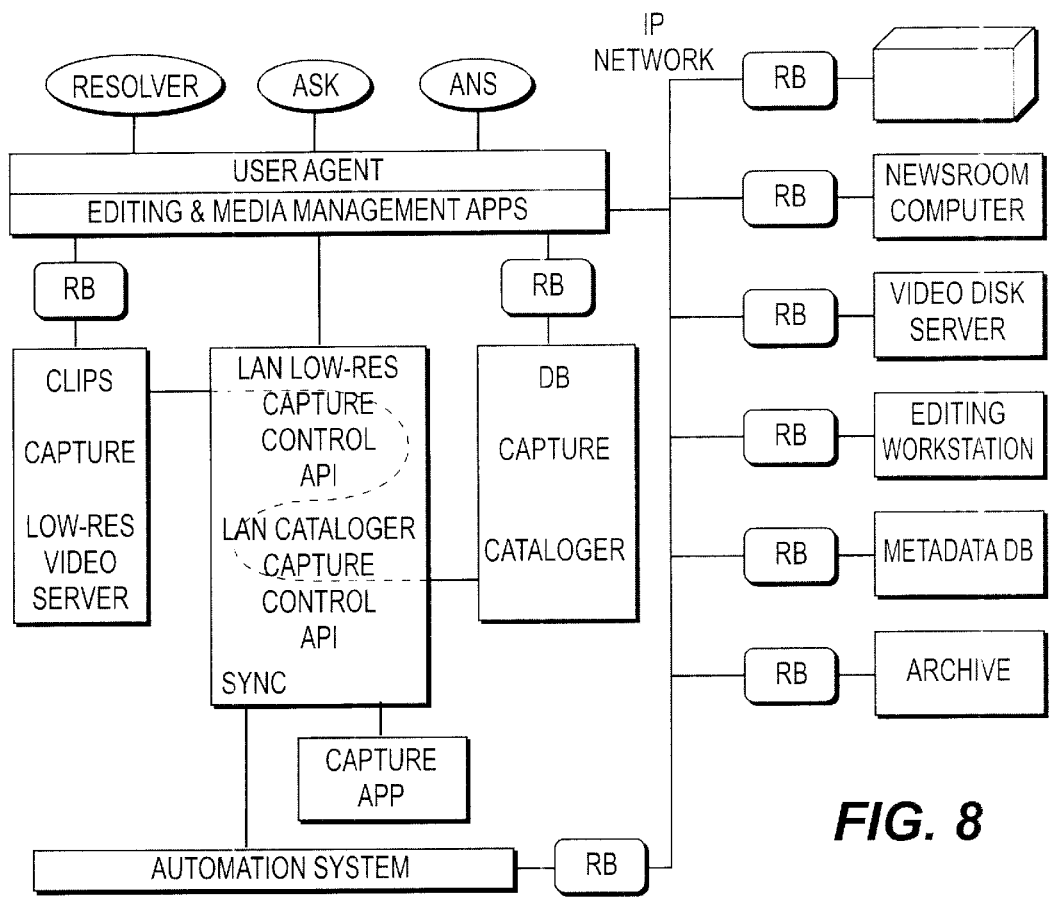
FIG. 8 is a logical diagram view of a broadcast environment ARM platform architecture according to the present invention.

Thus, the integration of the ARM Framework with, the Asset Management Agents and the Capture Services results in the Asset Management Platform System architecture, shown in FIG. 8 for a broadcast environment. This provides the environment for the development of flexible, user-friendly systems using digital media acquisition, editing, storage and transmission equipment by facilitating the rapid location and access to material throughout the system; providing a single, unified view of material on distributed digital media storage devices, replacing today's "islands of material"; and enabling development of systems using different content production applications and new technologies, such as low-resolution "desktop" video and automatic matadata generation, from different vendors. This is an open platform for Distributed Asset Management. This platform of "middleware" and APIs forms a layer between the applications and the underlying storage network.

What is claimed is:

1. A system for associative managing of distributed multimedia assets, comprising:

a plurality of distributed resources, including storage resources that store the multimedia assets, a plurality of user applications for operating on the multimedia assets, a plurality of asset management agents, the asset management agents including resource management agents coupled to the resources for managing the resources and user agents coupled to the user applications, and an asset/resource management framework coupled to the asset management agents for managing the association of the multimedia assets, wherein the asset management agents communicate with each other and with the resources and the user applications, and wherein the asset/resource management framework comprises a resolver agent that tracks the multimedia assets stored on the storage resources and associates multimedia assets of multiple versions with each other.

2. A system according to claim 1, wherein each independently addressable asset has a universal resource locator (URL) associated therewith and a resource management agent assigns a new URL to a new asset when the asset is created and registers the new URL with the resolver agent.

3. A system according to claim 2, wherein the URL includes:
   a device name that defines the storage resource by which the asset is stored,
   a location, and
   an asset name.

4. A system according to claim 1, for managing assets that include a set of logically equivalent assets, wherein the resolver agent creates a universal resource name (URN) for the set of logically equivalent assets.

5. A system according to claim 4, wherein the URN includes a globally unique identification (UID) for the set of logically equivalent assets and a revision identifier (REV).

6. A system according to claim 5, wherein each independently addressable asset has a universal resource locator (URL) associated therewith and a resource management agent assigns a new URL to a new asset when the new asset is created and registers the new URL with the resolver agent.

7. A system according to claim 5, wherein each independently addressable asset has a universal resource locator (URL) associated therewith, a resource management agent assigns a new URL to a new asset when the new asset is created as a member of the set of logically equivalent assets and registers the new URL with the resolver agent, and the resolver agent creates a new URN, including the UID for the set of logically equivalent assets and an incremented REV, and associates the new URL with the new URN.

8. A system according to claim 1, wherein the resources include database resources that store data and the resource management agents that manage the database resources each provide at least one database service.

9. A system according to claim 8, wherein the database service provided by a database resource has attributes that identify the data stored in the database, whether the database supports queries and whether the database is networked.

10. A system according to claim 1, wherein the resource management agents provide a transfer service for transferring a multimedia asset from a first storage resource to a second storage resource.

11. A system according to claim 1, comprising a capture services module coupled to a source of multimedia material for capturing such material and adding the captured multimedia material to the multimedia assets stored by the storage resources.

12. A system according to claim 11 wherein the capture services module is operative to capture high resolution material and equivalent low resolution material.

13. A system according to claim 11, wherein the capture services module is operative to capture multimedia material and metadata associated with the multimedia material.

14. A system according to claim 1, wherein the asset/resource management framework comprises an asset/resource management infrastructure coupled to the asset management agents and a plurality of system agents coupled to the asset/resource management infrastructure for routing data and queries to and from the asset management agents.

15. A system according to claim 1, wherein the asset management agents are organized as at least first and second agent domains including first and second asset/resource management frameworks respectively, and wherein each asset/resource management framework comprises a resolver agent that tracks multimedia assets stored on the storage resources to which the resource management agents of that agent domain are coupled.

16. A system according to claim 15, wherein a given asset has multiple versions and the resolver agent that tracks a given asset associates the multiple versions of said given asset with each other.

17. A system according to claim 16, wherein the resolver agent creates a universal resource name (URN) for a set of logically equivalent assets.

18. A system according to claim 17, wherein the URN includes a globally unique identification (UID) for the set of logically equivalent assets and a revision identifier (REV).

19. A system according to claim 18, wherein each independently addressable asset has a universal resource locator (URL) associated therewith and a resource management agent assigns a new URL to a new asset when the new asset is created and registers the new URL with the resolver agent.

20. A system according to claim 18, wherein each independently addressable asset has a universal resource locator (URL) associated therewith, a resource management agent assigns a new URL to a new asset when the new asset is created as a member of the set of logically equivalent assets and registers the new URL with the resolver agent, and the resolver agent creates a new URN, including the UID for the set of logically equivalent assets and an incremented REV, and the resolver agent associates the new URL with the new URN.

21. A method of associative managing of distributed multimedia assets comprising:
   storing the multimedia assets on a plurality of distributed storage resources,
   employing user applications to operate on the multimedia assets,
   employing asset management agents to manage the storage resources and the user applications, the asset management agents communicating with each other and including resource management agents coupled to the storage resources for managing the storage resources and user agents coupled to the user applications,
   employing an asset/resource management framework coupled to the asset management agents to manage the association of the asset, and
   wherein the asset/resource management framework comprises a resolver agent that tracks the multimedia assets stored on the storage resources and associates multimedia assets of multiple versions with each other.

22. A method according to claim 21, comprising creating a universal resource name (URN) for a set of logically equivalent assets.

23. A method according to claim 22, wherein the URN includes a globally unique identification (UID) for the set of logically equivalent assets and also includes a revision identifier (REV).

24. A method according to claim 23, wherein each independently addressable asset has a universal resource locator (URL) associated therewith and the method includes assigning a new URL to a new asset when the new asset is created and registering the new URL.

25. A method according to claim 23, comprising associating a universal resource locator (URL) with each independently addressable asset, assigning a new URL to a new asset when the new asset is created as a member of the set of logically equivalent assets, registering the new URL, creating a new URN including the UID for the set of logically equivalent assets and an incremented REV, and associating the new URL with the new URN.

26. A method according to claim 23, wherein the URL includes:
- a device name that defines the storage resource by which the asset is stored,
- a location, and
- an asset name.

27. A method according to claim 21, comprising storing data on database resources and employing resource management agents that manage the database resources to provide at least one database service.

28. A method according to claim 21, comprising coupling a capture services module to a source of multimedia material for capturing such material and adding the captured multimedia material to the multimedia assets stored by the distributed storage resources.

* * * * *